(12) United States Patent
Kelmartin et al.

(10) Patent No.: US 8,349,747 B2
(45) Date of Patent: Jan. 8, 2013

(54) HIGH SEAM STRENGTH ARCHITECTURAL FABRIC

(75) Inventors: Thomas Kelmartin, West Chester, PA (US); Martin Rodriguez, Bear, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 12/691,179

(22) Filed: Jan. 21, 2010

(65) Prior Publication Data

US 2010/0159181 A1     Jun. 24, 2010

Related U.S. Application Data

(63) Continuation-in-part of application No. 11/851,695, filed on Sep. 7, 2007, now Pat. No. 8,187,733, which is a continuation-in-part of application No. 11/195,911, filed on Aug. 2, 2005, now Pat. No. 7,501,356.

(51) Int. Cl.
  *B32B 5/02* (2006.01)
  *B32B 27/04* (2006.01)
(52) U.S. Cl. ............... 442/86; 442/131; 442/136
(58) Field of Classification Search ............ 442/79, 442/82, 85, 86, 136, 131
See application file for complete search history.

(56) References Cited

U.S. PATENT DOCUMENTS

| 3,513,064 A | 5/1970 | Westley | 161/92 |
|---|---|---|---|
| 3,953,566 A | 4/1976 | Gore | 264/288 |
| 4,670,503 A | 6/1987 | Neumann et al. | 524/520 |
| 4,749,610 A | 6/1988 | Katsuragawa et al. | 428/228 |
| 4,770,927 A | 9/1988 | Effenberger et al. | 428/245 |
| 4,943,473 A | 7/1990 | Sahatjian et al. | 428/245 |
| 4,946,736 A | 8/1990 | Sassa | 428/245 |
| 5,230,937 A | 7/1993 | Effenberger et al. | 428/113 |
| 5,262,234 A | 11/1993 | Minor et al. | 428/372 |
| 5,264,276 A | 11/1993 | McGregor et al. | 428/252 |
| 5,275,887 A | 1/1994 | Johnson et al. | 428/422 |
| 5,357,726 A | 10/1994 | Effenberger et al. | 52/309.7 |
| 5,358,780 A | 10/1994 | Kafchinski | |
| 5,401,901 A | 3/1995 | Gerry et al. | 174/35 |
| 5,433,996 A | 7/1995 | Kranzler et al. | 428/247 |
| 5,571,605 A * | 11/1996 | Abrams et al. | 442/195 |
| 5,759,924 A | 6/1998 | Sahlin | 442/60 |
| 5,814,405 A | 9/1998 | Branca et al. | 428/311.51 |
| 5,916,659 A | 6/1999 | Koerber et al. | 428/86 |
| 6,071,452 A | 6/2000 | Kelmartin, Jr. et al. | 264/230 |

(Continued)

FOREIGN PATENT DOCUMENTS

DE   20 2004 020048    3/2005

(Continued)

OTHER PUBLICATIONS

Supplemental European Search Report EP 06 78 8081.

(Continued)

*Primary Examiner* — Lynda Salvatore
(74) *Attorney, Agent, or Firm* — Allan M. Wheatcraft (57) ABSTRACT

An article useful as an architectural fabric having (a) a plurality of segments of fabric having a first surface and a second surface made of polytetrafluoroethylene fibers; and (b) a fluoropolymer coating disposed on at least the first surface of the fabric, and (c) at least one seam formed by an overlap of two of said segments, said seam having a seam warp strip tensile strength that is substantially equal to said nominal warp strip tensile strength at room temperature.

11 Claims, 7 Drawing Sheets

U.S. PATENT DOCUMENTS

| | | | |
|---|---|---|---|
| 6,517,919 B1 | 2/2003 | Griffin | 428/36.1 |
| 6,770,577 B2 * | 8/2004 | Kelmartin et al. | 442/86 |
| 7,163,601 B2 | 1/2007 | Kelmartin et al. | 156/333 |
| 7,501,356 B2 | 3/2009 | Kelmartin et al. | |
| 2004/0121677 A1 | 6/2004 | Jahn et al. | 442/82 |
| 2004/0219851 A1 | 11/2004 | Sahlin et al. | 442/254 |
| 2005/0143508 A1 * | 6/2005 | Tyagi et al. | 524/423 |
| 2006/0234575 A1 | 10/2006 | Salitsky | |
| 2007/0032152 A1 | 2/2007 | Kelamartin et al. | 442/88 |
| 2008/0032576 A1 | 2/2008 | Kelmartin et al. | 442/88 |
| 2008/0178993 A1 | 7/2008 | Kelmartin et al. | 156/243 |
| 2009/0087637 A1 | 4/2009 | Kelmartin et al. | 428/221 |

FOREIGN PATENT DOCUMENTS

| | | |
|---|---|---|
| DE | 20 2004 020 048 U1 | 4/2005 |
| EP | 0 202 996 A | 11/1986 |
| WO | WO 92 /09429 A | 6/1992 |
| WO | WO 00 02639 | 1/2000 |
| WO | WO 01/96695 | 12/2001 |

OTHER PUBLICATIONS

International Search Report dated Sep. 28, 2011 for PCT/US2011/020662.

\* cited by examiner

HIGH SEAM STRENGTH ARCHITECTURAL FABRIC

RELATED APPLICATIONS

This application is a continuation-in-part of U.S. application Ser. No. 11/851,695, filed Sep. 7, 2007, now U.S. Pat. No. 8,187,733 issued May 9, 2012, which in turn is a continuation-in-part of U.S. application Ser. No. 11/195,911 filed Aug. 2, 2005, now U.S. Pat. No. 7,501,356 issued Mar. 10, 2009.

FIELD OF INVENTION

The present invention relates to fabric and, more particularly, to architectural fabric that is waterproof, fire retardant, flexible, durable, and aesthetically pleasing and having exceptional seam strength.

BACKGROUND OF INVENTION

Architectural fabric is fabric used as a building structure or part of a building structure. It typically provides protection for humans from elements such as wind, sun, and rain. It may be a permanent structure or a temporary one. If temporary, it may be retractable or removable, for example by folding, rolling, or otherwise storing.

There are several requirements for architectural fabric. It must be strong enough to withstand wind and other stresses during assembly and use. It must be flexible and durable, so that it can be folded or rolled and its strength and integrity are maintained over time. It must be UV light resistant. UV light tends to degrade and weaken fabric over time. A fabric that is UV resistant will stand up under this exposure. It should generally be fire retardant and waterproof. It should be easily seamed (or "welded") and these seams must be strong, both at room temperature and extreme temperatures. It must also be aesthetically pleasing.

A known architectural fabric is a composite consisting of fiberglass fabric coated with PTFE. Although this product has certain desirable qualities, it is not suitably flexible. The fabric thus cannot be used efficiently in applications where convenient removal of the fabric is needed.

Another known architectural fabric has a coating of PVC or acrylic on polyester fabric. These products have flexibility but only limited durability. Unless specially treated, these fabrics are flammable and tend to degrade under UV light. After a certain amount of flexing and UV exposure, these products develop cracks or other imperfections that allow water to penetrate the fabric at the point where it has been compromised.

Another known architectural fabric is that disclosed in U.S. Pat. No. 6,770,577B2 to Kelmartin et al. The article disclosed therein comprises a polytetrafluoroethylene fabric attached to at least one composite membrane of a porous polytetrafluoroethylene film having a fluoropolymer adhesive (such as THV) contained in its pores. The porous polytetrafluoroethylene film is provided to make the article durable and aesthetically pleasing. Addition of the film requires additional processing, however. The film also tends to mute any pigments or colors in the fabric or the THV.

In situations where panels of fabric are welded together at elevated temperatures, seam strength is compromised when using known fabrics. Polymers such as THV may soften at elevated temperatures, thereby compromising seam strength.

An economical, weldable, waterproof, fire retardant architectural fabric with exceptional seam strength is needed in the industry.

SUMMARY OF INVENTION

The present invention provides an architectural fabric for retractable, temporary, or permanent structures having a plurality of segments, each segment including a layer of fabric having a first surface and a second surface and being made of expanded polytetrafluoroethylene fibers. The layer of fabric has a nominal warp strip tensile strength. Also included is a fluoropolymer coating disposed on at least one of the first surface and second surface and extending between and among the fibers from the respective first or second surface. At least one seam is formed by an overlap of two of the segments, the seam having a seam warp strip tensile strength that is substantially equal to the nominal warp strip tensile strength of the fabric at room temperature.

Preferably, the fluoropolymer coating is either PVDF or ETFE. When the overlap is 2.5 inches, the seam warp strip tensile strength at room temperature is greater than 456 lbf/in (nominal warp strip tensile strength of the fabric), and at 70 degrees C., it is greater than 300 lbf/in. The fill strip tensile strength of seam at room temperature that is preferably greater than 400 lbf/in, and at 70 degrees C., it is greater than 200 lbf/in.

Also preferably, the architectural fabric of the invention has a light transmission of at least 40%, and is waterproof and flame retardant, and the seam is a radio frequency or hot bar welded seam. A pigment is optionally included in said fluoropolymer coating. The fibers of the fabric are optionally densified and may contain a filler.

In another aspect, the present invention provides a method of changing the mode of failure at ambient temperature, in the warp direction, of a seam of an architectural fabric constructed of expanded polytetrafluoroethylene fibers from fiber pullout to ultimate fabric strength by coating the fibers with a fluoropolymer coating selected from the group consisting of PVDF and ETFE.

In still another aspect, the invention provides a method of increasing seam strength at elevated temperature (70° C.), of an architectural fabric made of expanded polytetrafluoroethylene fibers by a minimum of 50% and 20% in the warp and fill directions respectfully, by coating the fibers with a fluoropolymer selected from the group consisting of PVDF and ETFE.

In yet another aspect, the invention provides a method of increasing seam toughness at ambient temperature, of an architectural fabric having expanded polytetrafluoroethylene fibers by a minimum of 35% and 85% in the warp and fill directions respectfully, by coating said fibers with a fluoropolymer selected from the group consisting of PVDF and ETFE.

In a final aspect, the invention provides a method of increasing seam toughness at elevated temperature (70° C.), of an architectural fabric having expanded polytetrafluoroethylene fibers by a minimum of 95% and 100% in the warp and fill directions respectfully, by coating said fibers with a fluoropolymer selected from the group consisting of PVDF and ETFE.

DETAILED DESCRIPTION OF INVENTION

Figure 1:
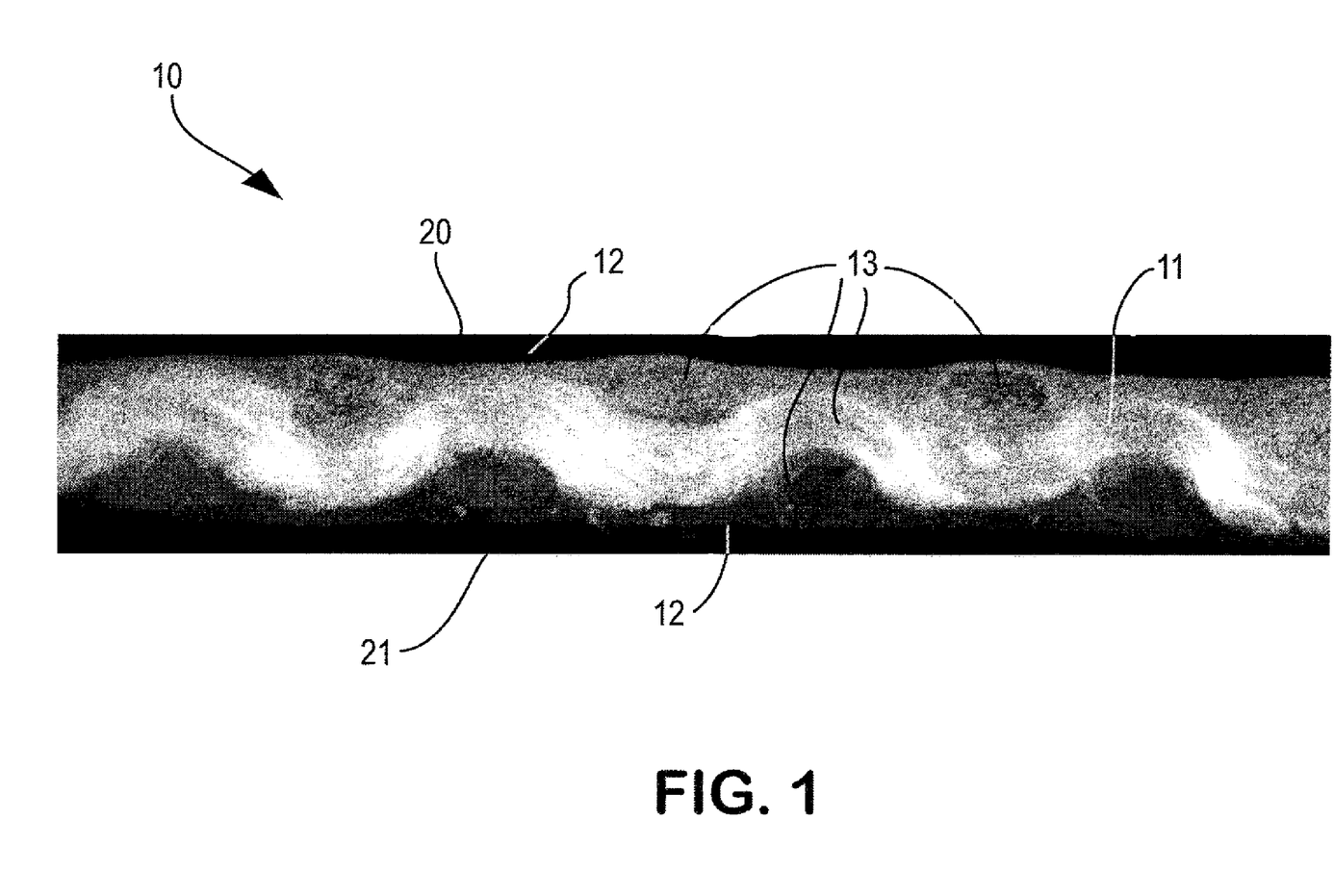
FIG. 1 is an optical micrograph of a cross-section of an article in accordance with an exemplary embodiment of the present invention.

The present invention will now be described with reference to the figures in the drawing. FIG. 1 is an optical micrograph of a cross-section of an article 10 according to an exemplary embodiment of the present invention. In this exemplary embodiment, article 10 is an architectural fabric. Article 10 includes a fabric 11 made of fibers 13 of a fluoropolymer material, preferably PTFE fibers that have sufficient strength for a particular application, and most preferably expanded PTFE fibers. Fabric 11 has a warp and a weft direction, accounting for the cross-sectional views perpendicular to and parallel to the axes of the individual fibers of fabric 11 shown in FIG. 1.

Fabric 11 has a first surface 20 and a second surface 21. Disposed adjacent to first surface 20, which extends along fibers 13 in both the warp and weft direction, and extending in between and among fibers 13 is a fluoropolymer coating 12, preferably PVDF (most preferably a copolymer of vinylidene fluoride and hexafluoropropylene) or ETFE (most preferably a copolymer of ethylene tetrafluoroethylene).

Article 10 is useful as an architectural fabric with only first surface 20 covered by fluoropolymer coating 12. A preferable embodiment, however, also has fluoropolymer coating 12 disposed on second surface 21 (and extending between and among fibers 13 from such second surface 21).

Fabric 11 is any material that is UV light resistant and fire retardant. It must also be strong, flexible and durable. PTFE fiber is preferred. Fabric made from expanded polytetrafluoroethylene fibers is most preferred.

Fluoropolymer coating 12 is a material that is UV light resistant and fire retardant. PVDF and ETFE are preferred. This preferred fluoropolymer coating is also advantageously flexible, adherent to the fabric 11, clear or translucent, and provide excellent seam strength when panels of fabric are welded together. Preferably, the coating on both sides of the fabric is the same material. The fluoropolymer can be filled for functionality, such as color, UV resistance (if needed, for example if no PTFE fabric is used), and flame resistance.

Figure 2:
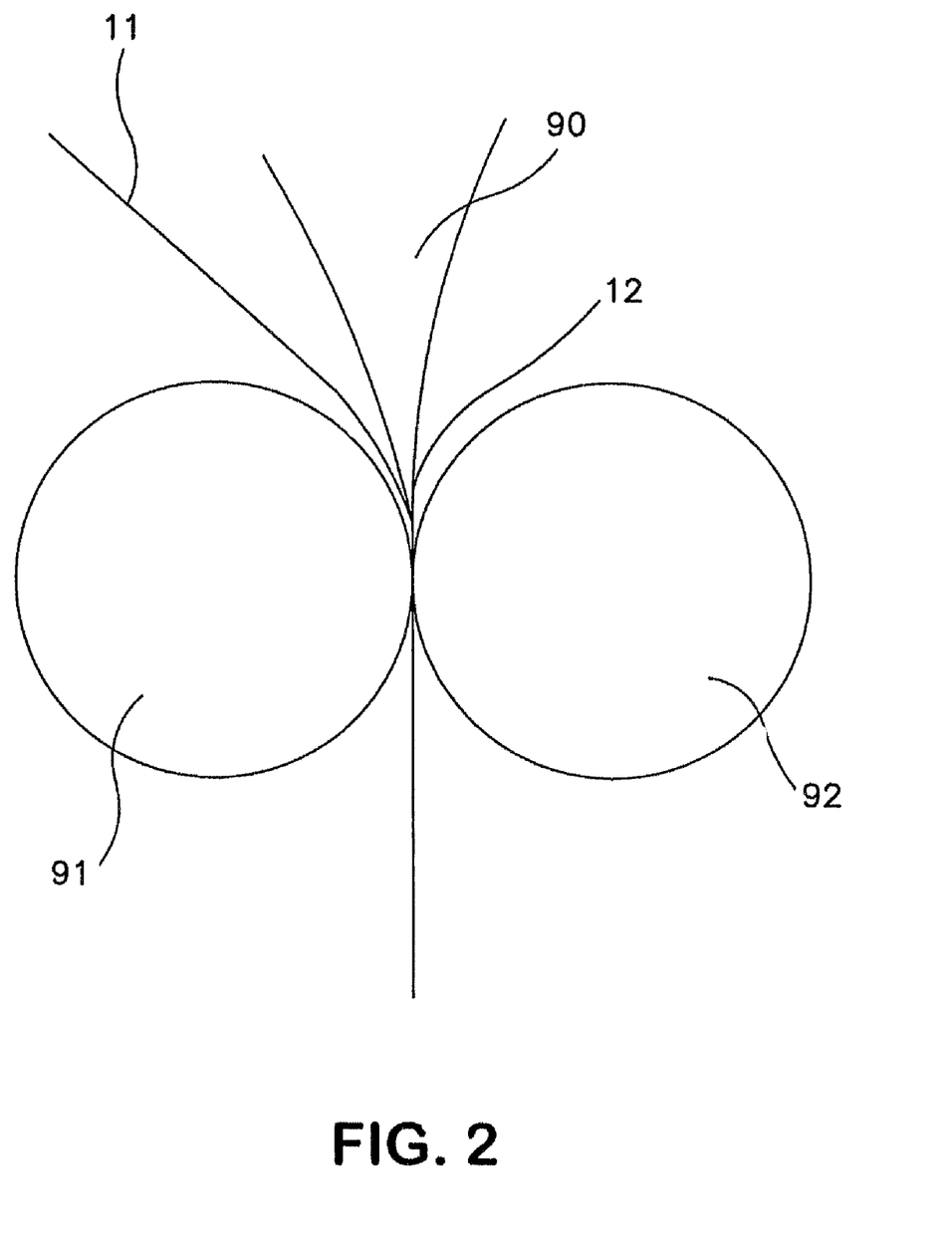
FIG. 2 is a schematic illustration of an exemplary process for making an article according to the present invention.

Fluoropolymer coating 12 is preferably applied to fabric 11 by extrusion coating, although other methods, such as solvent coating or lamination with or without the use of release layers are alternatives. FIG. 2 depicts a preferred extrusion coating process for making the architectural fabric of this invention. Fabric 11 is passed between rolls 91 and 92 while fluoropolymer coating 12 is simultaneously extruded onto fabric 11 from extruder 90. The surfaces of rolls 91 and 92, as well as the temperature and speed of the rolls are critical processing parameters for making the present invention. Details of these parameters are given in the example below.

Surprisingly, Applicant has discovered that when panels of the article of the present invention are welded together, the seam between the panels has particularly high strength. This is true both at room temperature and elevated temperature. As a result, many different kinds of bonding techniques can be used to form the seam, such a hot bar welding and radio frequency welding.

In particular, the inventors have discovered that coating the fabric with PVDF or ETFE produces a seam that has a seam warp strip tensile strength that is substantially equal to the nominal warp strip tensile strength of the base fabric itself at room temperature. Fundamentally, the inventors have discovered that the failure mode at ambient temperature for a seam of architectural fabric can be changed from fiber pull-out (seen with conventional fabric seams) to ultimate fabric strength, by coating the base fabric with PVDF or ETFE.

Also surprisingly, article 10 can be much more easily seam-sealed to itself using welding techniques known in the art of seam-sealing for example, with PTFE/fiberglass fabrics. This is a result of the elimination of the microporous PTFE element described in U.S. Pat. No. 6,770,577B2. A variety of seaming techniques can be used. A secure seam is formed by applying heat (about 230 degrees C. for 45 seconds) and pressure to overlapped portions of the inventive fabric. A suitable seam sealing device is an electric impulse hot bar welder available from Aline Heat Sealing Corporation, Cerritos Calif., part number HD-25. Surprisingly, radio frequency welding can also be used, as can wedge welding and hot-air welding. Using the invention, one can easily get a strong weld without the need for special processing, or for adding additional adhesives or seam tape as with other fabrics currently used.

The following example is intended to illustrate, but not limit, the present invention.

EXAMPLES

Comparative Example 1

THV221G (Dyneon, Inc, Oakdale, Minn.) which was pigmented tan was extruded using a single screw extruder and a slotted die at a temperature of 250 C. It was directed vertically downward into a nip created by two rolls; one being a TEFLON®-sleeved EPDM rubber roll and the other a TEFLON®-coated steel roll. The thickness of the extruded film was 175 micrometers. The EPDM roll had a surface temperature of 90 C, and the steel roll had a surface temperature of 115 C. The surface speed of the rolls was 2.75 meters per minute. Fabric woven of expanded PTFE fiber was obtained from W.L. Gore & Associates, Inc. This fabric was woven in a plain weave, 18 ends by 18 picks per centimeter. Each end and each pick yarn was composed of two 500 denier expanded PTFE fibers plied together. (This fabric was subjected to the strength test set forth below under the heading "Seam Strength" in the warp direction, except not on a seam, just the fabric itself, in order to establish a nominal warp strip fabric strength. The result was 456 lbf/in.)

The fabric entered the nip over the steel roll and was pressed against the molten THV221G in the nip. The nip force was 130 Newtons per centimeter. The THV221G was pushed into the voids in the fabric by the action of the nip. The resulting THV221G/fabric composite was wound onto a roll at the end of the extrusion line.

The aforementioned THV221G/fabric composite was then run a second time on the extrusion line except that a second coating of molten THV221G pigmented red was applied to the fabric face which was not extruded upon in the first pass. The machine conditions were the same for this second pass as they were for the first pass. This material produced in this example was identified as 360-75. The thickness of the THV221G/fabric composite was 0.65 millimeters, and the mass per unit area was 1240 grams per square meter.

Inventive Example 1

An architectural fabric was produced in a manner similar to Comparative Example 1, except that PVDF 3120-10 (Arkema Inc., Philadelphia, Pa.) was used instead of THV221G.

Inventive Example 2

An architectural fabric was produced in a manner similar to Comparative Example 1, except that ETFE LM-730A (Asahi Glass Company, Downingtown, Pa.) was used instead of THV221G.

Testing

The following procedures are used to test for various properties of architectural fabric.

(1) Waterproofness

Apparatus:
  RO/Distilled water
  Thermometer
  Low Hydrostatic Pressure Tester (Alfred Suter Co., Ramsey, N.J., Model No. 502 Suter LHPT)
  Timer
  Water Circulator Test Specimens:
  Specimen size: circular sample of 4½" (11.4 cm) diameter.
  Specimens per sample: Three.

Conditioning: Condition the specimens at 21±1° C. (70±2° F.), 65±2% RH prior to testing.

Test Procedure:
1. Check the water level in the tank.
2. Add water if the level is too low.
3. Turn the pump on.
4. Check that the water temperature is at 27±3° C. (80±5° F.).
   4.1 Run the motor to heat or add heated water to the tank if the water temperature is too low.
   4.2 Float an ice pack, located in the freezer, in the tank to lower the temperature if the water temperature is too high (or becomes too high while testing), or add cold water.
5. Purge the water lines.
6. Place a specimen face side down under the specimen holder.
7. Clamp the specimen in place.
8. Open the valves to start water flow.
9. Set a timer for 3 minutes.
10. Start the timer when the gauge on the LPHT tester reaches the specified pressure (1.1 psig).
11. Check each specimen for leaks. Samples that leak are reported as failures. Those that do not leak, pass.
    11.1 Failures should only be counted if leaks occur in the test area.
        11.1.1 Drops of water penetrating the specimen at the clamped edge of the specimen or within 0.32 cm (⅛") of this edge shall not be counted.

Samples of Inventive Examples 1 and 2 were tested as described above, and both samples passed with no leakage.

(2) Fire Retardance

The example fabric was tested for fire retardance as follows.

Apparatus:

| | |
|---|---|
| Cabinet including Tirrill Burner | Brass weights |
| Metal specimen holder and clips | Scissors or hole punch |
| Specimen mounting block | Butane lighter |
| Timer (tenths of seconds) | Disposable gloves |
| Metric ruler (1 mm graduations) | Gas: methane 99% pure |
| Plastic bag | |

Test Specimens:
  Specimen size: 3"×12" with the 12" length parallel to the test direction.
  Number of samples: two.

Conditioning: Condition the specimens at 70±2° F., 65±2% RH prior to testing.

Test Procedure:
1. Cut specimens as specified above.
   1.1. Ensure that the gas pressure is 2.5±0.25 psi.
   1.2. Turn power on (control panel on counter).
   1.3. Turn the pilot knob slightly counter-clockwise, so that it is on.
   1.4. Ignite the pilot with the butane lighter.
   1.5. Adjust the pilot size to ⅛" using the pilot knob. Measure the pilot flame from its lowest point to the tip.
   1.6. Set the flame ignition timer to 120 seconds.
   1.7. Turn the flame/fan knob to flame and burn the flame for at least 2 minutes prior to the beginning of each set up and testing session.
   1.9. Adjust the flame height to 1.5" by turning the knob at the bottom of the burner clockwise to increase the height or counter clockwise to decrease the height. The tip of the flame should reach the top point of the flame indicator.
   1.10. Re-set the flame ignition timer to 12 seconds and re-light the flame.
   1.11. Turn the flame/fan knob to fan.
   1.12. Place the metal specimen holder on the mounting block.
   1.13. Align a dummy specimen in the metal holder with the short edge of the dummy aligned with the lower edge of the holder,
   1.14. Close the specimen holder and clamp with the clips at two places on each side making sure the dummy is smooth and flat in the holder,
   1.15. Turn the flame/fan knob to flame.
   1.16. Light the flame with the butane lighter.
   1.17. Immediately turn the flame/fan knob to off.
   1.18. Position the specimen holder securely in the cabinet.
   1.19. Make sure the holder is positioned in the groove of the holder rest at the back of the cabinet and the middle of the lower edge of the specimen is centered ¾" above the burner,
   1.20. Close the cabinet door and the hood sash.
       Note: The specimen must be tested within 2 minutes of being placed in the cabinet.
   1.21. Turn the flame/fan knob to flame to start the 12-second flame.
   1.22. Once the 12-second flame has extinguished confirm that the pilot light is the proper size.
   1.23. Depress the door release button and allow the cabinet to ventilate for 30 seconds or until all smoke and fumes are removed.
   1.24. Adjust the pilot light, if necessary, and repeat steps 1.15 through 1.24 as needed until proper pilot size is maintained.

2. Testing:
  2.1. Place the metal specimen holder on the mounting block.
  2.2. Align the specimen in the metal holder such that the test area does not contain any identification markings when the short edge of the specimen is aligned with the lower edge of the holder.
  2.3. Close the specimen holder and clamp with clips at two places on each side making sure the specimen is smooth and flat in the holder,
  2.4. Turn the flame/fan knob to flame.
  2.5. Light the flame with the butane lighter,
  2.6. Immediately turn the flame/fan knob to off.
  2.7. Position the specimen holder securely in the cabinet.
  2.8. Make sure that the holder is positioned in the groove of the holder rest at the back of the cabinet and that the middle of the lower edge of the specimen is centered ¾" above the burner.
  2.9. Close the cabinet door and the hood.
  Note: The specimens must be tested within 2 minutes of being place in the cabinet.
  2.10. Turn the flame/fan knob to flame to start the 12-second flame.
  2.11. Determine the after-flame, and after-glow time, and the presence of melting or dripping, after the 12-second flame extinguishes, and record in the lab database.
    2.11.1. After-flame: Using the timer mounted on the hood, measure the number of seconds, to the nearest 0.1 seconds, that the material continues to burn after the igniting flame extinguishes. Do not turn the fan on until the specimen has stopped glowing, regardless of whether or not the after-glow is being measured.
    2.11.2. After-glow: Using the automatic timer, measure the number of seconds, to the nearest 0.1 seconds, that the material glows after the flaming ends. The glow shall not be extinguished even if after-glow time is not being evaluated because of the glow's effect on char length.
    2.11.3. Melt/Drip: Look for signs of melting or dripping.

(3) Seam Strength

Two pieces of the example fabric were placed in overlapping relationship in the warp direction, such that 2.5 inches (6.35 cm) of each piece overlapped. No seam tape was used, nor was any scuffing or abrasion performed on the areas to be welded. The overlap was welded to form a seam. For Comparative Example 1 and Inventive Example 1, the seam was radio frequency welded using a Thermatron device, power setting 1066, preheated to 125 degrees F., for 6 seconds preweld, 6 seconds weld, 6 seconds cool down. For Inventive Example 2, the seam was hot bar welded using an Aline Welder Model HD-25 on both sides at 260 degrees C. for 30 seconds at 15 psi. Strips of the fabric were cut 2.5 inches (6.35 cm) wide by 14 inches (35.5 cm) long with the long direction perpendicular to the seam. The seam strength was tested by pulling the seam on a tensile tester (Instron Corporation, Norwood Mass., Model 5567) with 4 inch (10.16 cm) gauge length at 2 inches (5.08 cm) per minute extension rate. Five such specimens were produced. The results are tabulated below, and indicate a very strong seam was produced using this simple welding technique on the inventive fabric. A seam having a strength of at least 90% of the nominal strength of the fabric is desired.

Figure 3A:
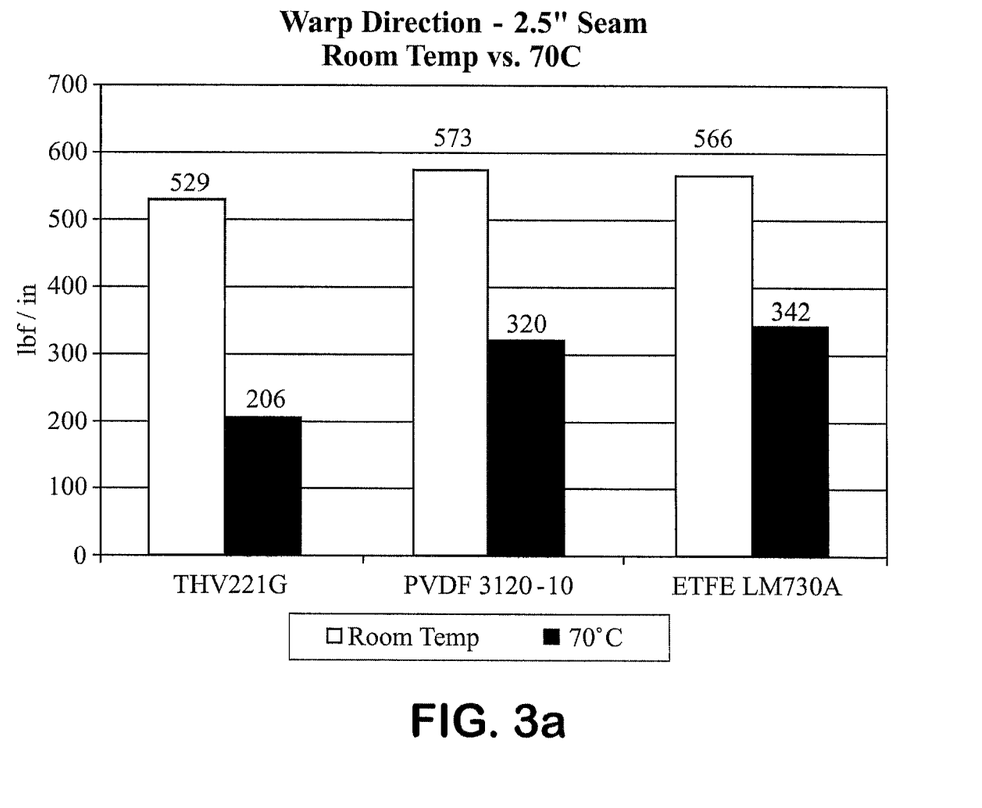
FIG. 3a is a bar chart of the results of seam strip tensile testing in the warp direction.

Comparative Example 1 and Inventive Examples 1 and 2 were all tested for seam strength in both the warp and fill directions. These tests were done both at room temperature and at 70 degrees C. As shown in FIG. 3a, the warp seam strip tensile strength of PVDF (Inventive Example 1) was 573 lbf/in at room temperature, which is 8% higher than the THV (Comparative Example 1), which was 529 lbf/in. Also at room temperature, the ETFE (Inventive Example 2) had a warp strip tensile strength of 566 lbf/in, 7% higher than the Comparative Example 1.

At elevated temperature of 70 degrees C., PVDF (Inventive Example 1 had a warp strip seam tensile strength of 320 lbf/in, 55% higher than Comparative Example 1, which was 206 lbf/in. Similarly ETFE (Inventive Example 2) had a warp strip seam tensile strength of 342 lbf/in, 66% higher than the Comparative Example 1.

Figure 4:
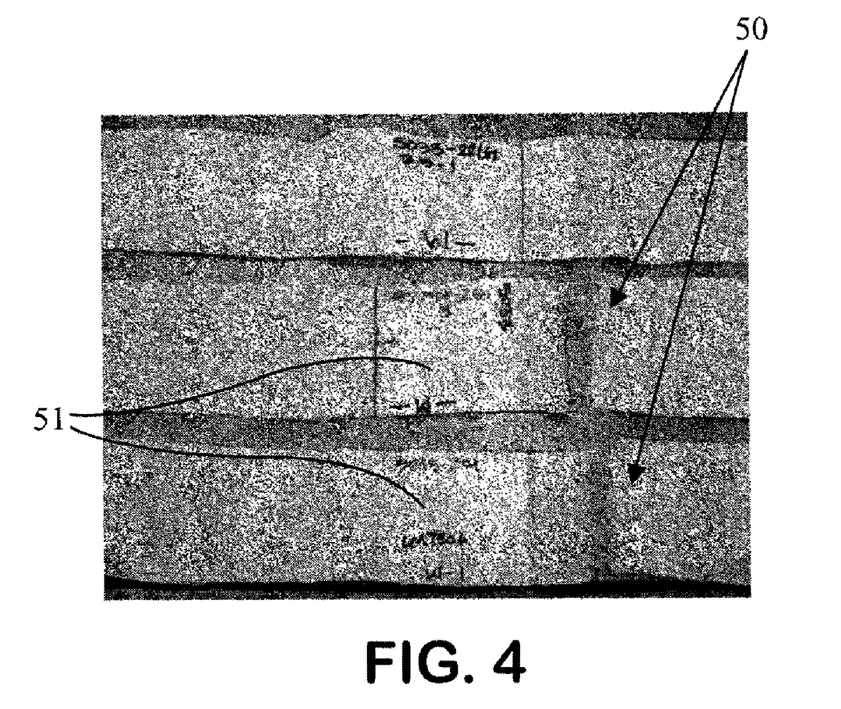
FIG. 4 is a photograph of the inventive examples illustrating the mode of failure change using the present invention.
Figure 5:
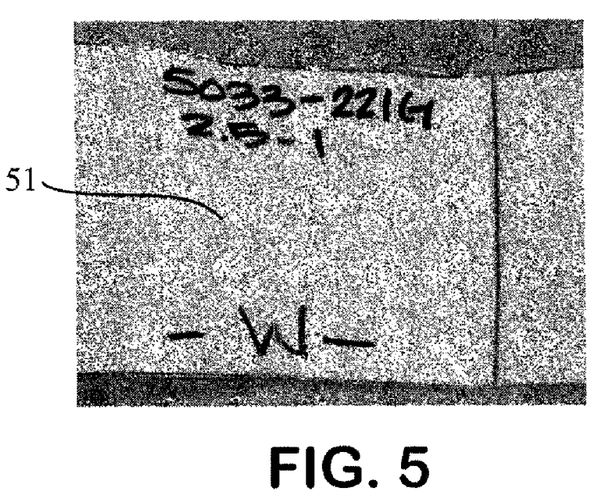
FIG. 5 is an enlarged view of the seam of the inventive example shown in FIG. 4.

Surprisingly, the inventors also discovered, as illustrated in FIGS. 4 and 5, that these seam strength tests indicate a change in the mode of failure of the seams from fiber pullout (with Comparative Example 1) to ultimate fabric strength (with the Inventive Examples). Specifically, FIGS. 4 and 5 show that for the Inventive Examples, the strength tests resulted in tears 50 of the fabric itself, not the seam 51. This is quite surprising.

Figure 3B:
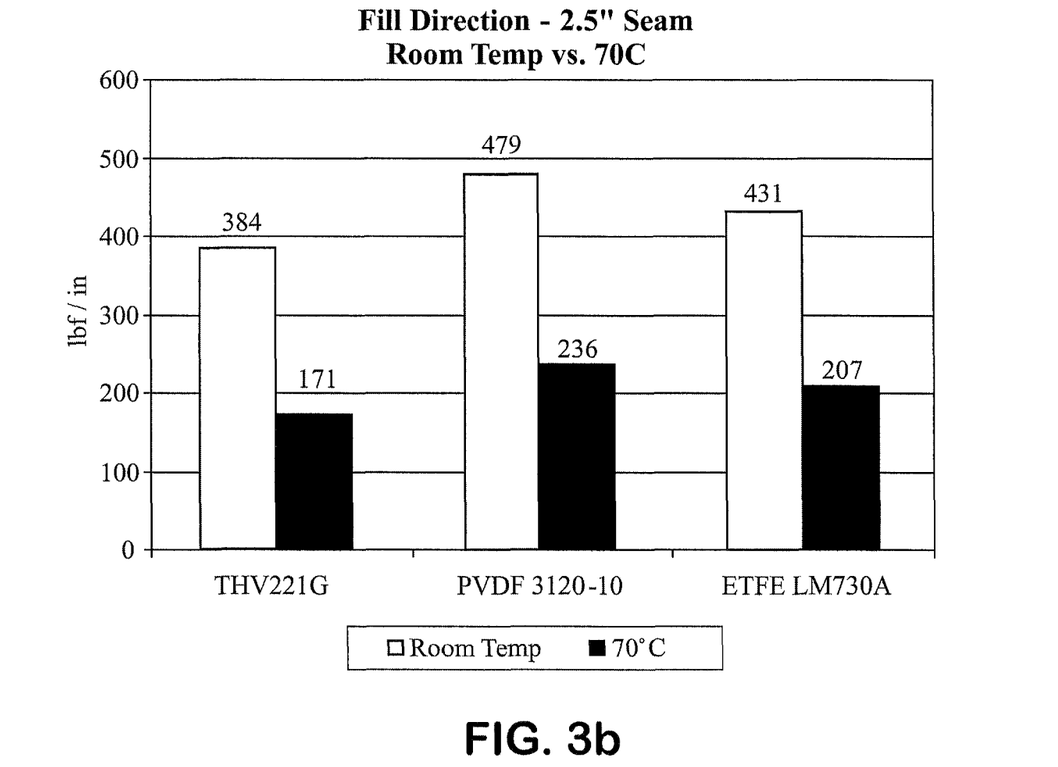
FIG. 3b is a bar chart of the results of seam strip tensile testing in the fill direction.

FIG. 3b illustrates the results of the seam strength testing in the fill direction. Specifically, the fill seam strip tensile strength of PVDF (Inventive Example 1) was 479 lbf/in at room temperature, which is 25% higher than the THV (Comparative Example 1), which was 384 lbf/in. Also at room temperature, the ETFE (Inventive Example 2) had a fill strip tensile strength of 431 lbf/in, 12% higher than the Comparative Example 1.

At elevated temperature of 70 degrees C., PVDF (Inventive Example 1 had a fill strip seam tensile strength of 236 lbf/in, 38% higher than Comparative Example 1, which was 171 lbf/in. Similarly ETFE (Inventive Example 2) had a fill strip seam tensile strength of 207 lbf/in, 21% higher than the Comparative Example 1.

These data indicate that using the fluoropolymer coating of the present invention considerably increases seam strength, particularly at elevated temperatures, over conventional coatings. This enables seaming and processing at higher temperatures without compromising the fabric. This is a significant advance in the art of architectural fabrics.

(4) Toughness

Toughness was measured according to the formula and method set forth in U.S. Pat. No. 6,071,452, which is incorporated herein for its teaching on toughness measurement.

Figure 6:
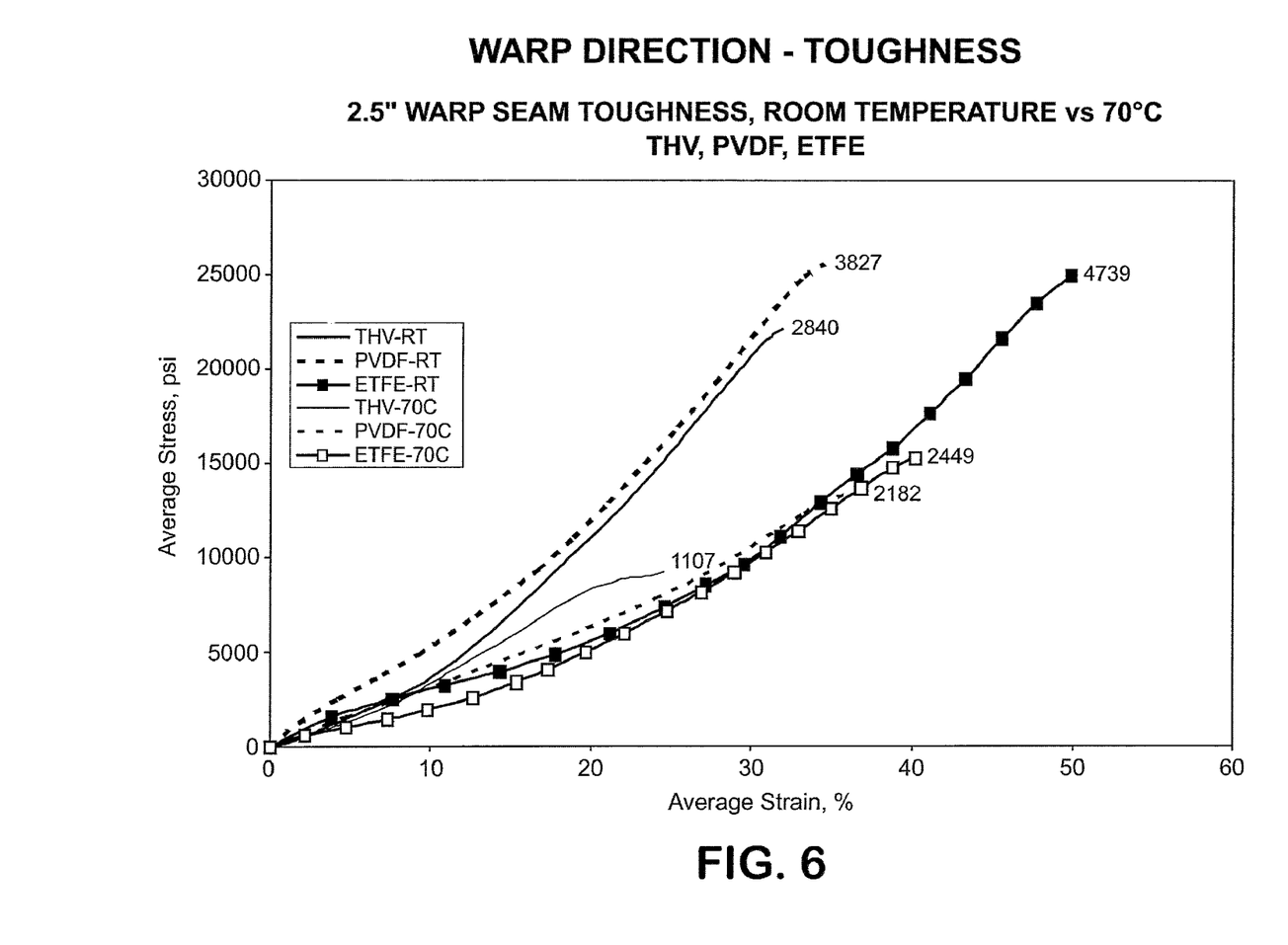
FIG. 6 is a graph of the warp direction toughness of the inventive examples compared to the comparative example.
Figure 7:
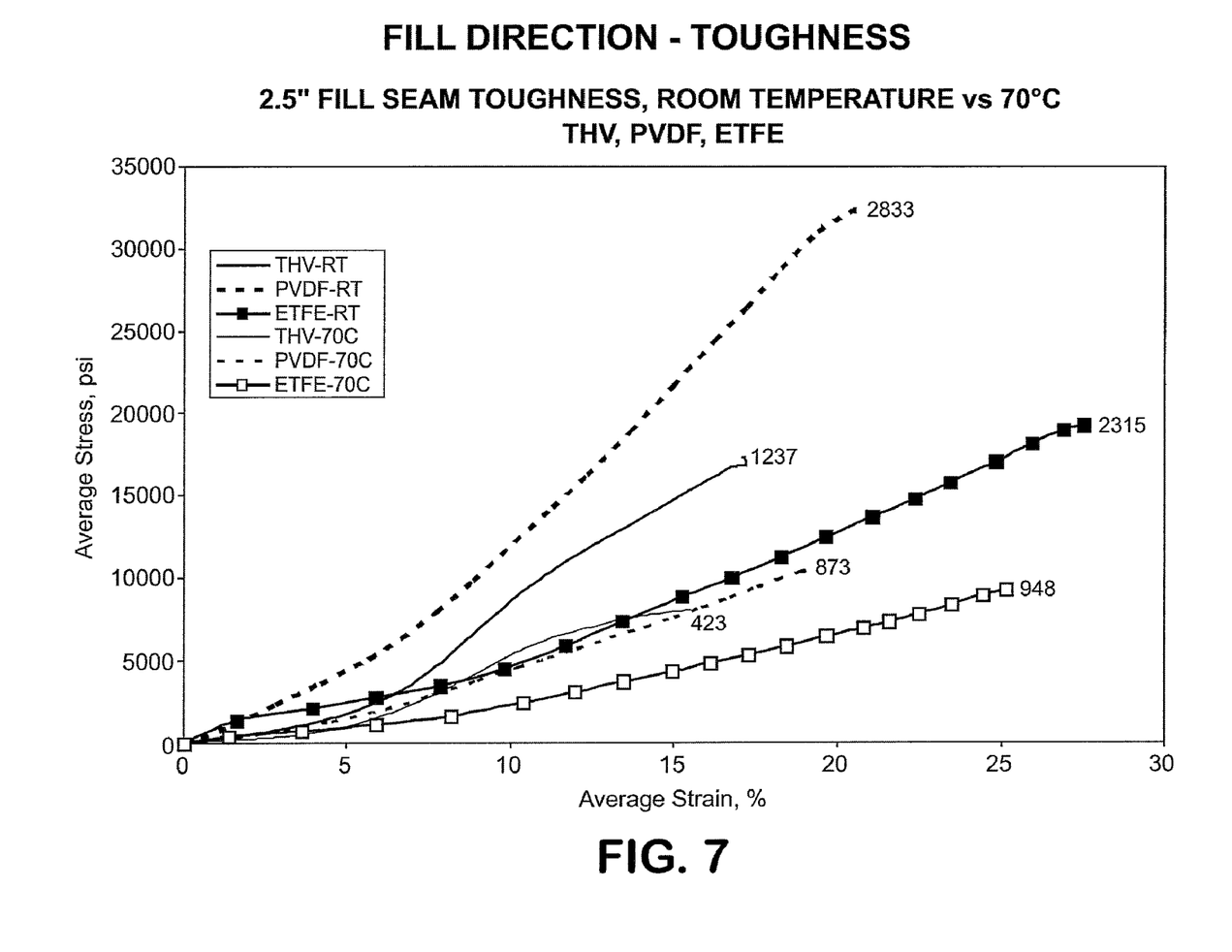
FIG. 7 is a graph of the fill direction toughness of the inventive examples compared to the comparative example.

Toughness measurements were made on Comparative Example 1 (THV) and both Inventive Examples (PVDF and ETFE) at room temperature and elevated temperature of 70 degrees C. The data are shown in FIGS. 6 (for the warp direction toughness) and 7 (for the fill direction toughness). As can be seen, the present invention improves toughness in the warp and fill directions by 35% and 85%, respectfully.

The table below summarizes the warp direction strength and toughness data.

| | 2.5" OVERLAP SEAM - WARP DIRECTION | | | |
| --- | --- | --- | --- | --- |
| | SEAM STRENGTH, lb/in | | TOUGHNESS, psi | |
| POLYMER | ROOM TEMP | 70° C. | ROOM TEMP | 70° C. |
| THV | 529 | 206 | 2840 | 1107 |
| PVDF | 573 | 320 | 3827 | 2182 |
| ETFE | 566 | 342 | 4739 | 2449 |

The table below summarizes the fill direction strength and toughness data.

| 2.5" OVERLAP SEAM - FILL DIRECTION | | | | |
|---|---|---|---|---|
| | SEAM STRENGTH, lb/in | | TOUGHNESS, psi | |
| POLYMER | ROOM TEMP | 70° C. | ROOM TEMP | 70° C. |
| THV | 384 | 171 | 1237 | 423 |
| PVDF | 479 | 236 | 2833 | 873 |
| ETFE | 431 | 207 | 2315 | 948 |

While particular embodiments of the present invention have been illustrated and described herein, the present invention should not be limited to such illustrations and descriptions. It should be apparent that the changes and modifications may be incorporated and embodied as part of the present invention within the scope of the following claims.

What is claimed is:

1. An architectural fabric for retractable, temporary, or permanent structures comprising:
   a. a plurality of segments, each segment comprising:
      i. a layer of fabric having a first surface and a second surface and comprising expanded polytetrafluoroethylene fibers, said layer of fabric having a nominal warp strip tensile strength; and
      ii. a fluoropolymer coating disposed on at least one of said first surface and said second surface and extending between and among said fibers from said respective first or second surface; and
   b. at least one seam formed by an overlap of two of said segments, said seam having a seam warp strip tensile strength that is substantially equal to said nominal warp strip tensile strength at room temperature;
   wherein said architectural fabric has a light transmission of at least 40%, and is waterproof and flame retardant.

2. An architectural fabric as defined in claim 1 wherein said fluoropolymer coating comprises PVDF.

3. An architectural fabric as defined in claim 1 wherein said fluoropolymer coating comprises ETFE.

4. An architectural fabric as defined in claim 1 wherein said overlap is 2.5 inches and said seam warp strip tensile strength at room temperature is greater than 456 lbf/in.

5. An architectural fabric as defined in claim 1 wherein said overlap is 2.5 inches and said seam warp strip tensile strength at 70 degrees C. is greater than 300 lbf/in.

6. An architectural fabric as defined in claim 1 wherein said overlap is 2.5 inches and said seam has a fill strip tensile strength at room temperature that is greater than 400 lbf/in.

7. An architectural fabric as defined in claim 1 wherein said overlap is 2.5 inches and said seam has a fill strip tensile strength at 70 degrees C. that is greater than 200 lbf/in.

8. An architectural fabric as defined in claim 1 wherein said seam is a radio frequency or hot bar welded seam.

9. An architectural fabric as defined in claim 1 further comprising a pigment in said fluoropolymer coating.

10. An architectural fabric as defined in claim 1 wherein said fibers are densified.

11. An architectural fabric as defined in claim 1 wherein said fibers further comprise a filler.

* * * * *